US012798791B2

(12) United States Patent
Nagle

(10) Patent No.: US 12,798,791 B2
(45) Date of Patent: Nov. 17, 2026

(54) AIRCRAFT ENGINE SEAL APPARATUS

(71) Applicant: J.B. ROCHE (MFG) LIMITED, Cork (IE)

(72) Inventor: Ian Nagle, Cork (IE)

(73) Assignee: J.B. ROCHE (MFG) LIMITED, Cork (IE)

( * ) Notice: Subject to any disclaimer, the term of this patent is extended or adjusted under 35 U.S.C. 154(b) by 0 days.

(21) Appl. No.: 19/120,003

(22) PCT Filed: Oct. 16, 2023

(86) PCT No.: PCT/EP2023/078637

§ 371 (c)(1),
(2) Date: Apr. 10, 2025

(87) PCT Pub. No.: WO2024/083722

PCT Pub. Date: Apr. 25, 2024

(65) Prior Publication Data

US 2026/0125162 A1 May 7, 2026

(30) Foreign Application Priority Data

Oct. 17, 2022 (EP) .................................... 22201955

(51) Int. Cl.
*B64F 1/00* (2024.01)
*B64F 5/40* (2017.01)

(52) U.S. Cl.
CPC ................ *B64F 1/005* (2013.01); *B64F 5/40* (2017.01); *F05D 2260/95* (2013.01)

(58) Field of Classification Search
CPC .......... F01D 25/243; B64F 5/40; B64F 1/005; F05D 2260/95; B64D 33/02
See application file for complete search history.

(56) References Cited

U.S. PATENT DOCUMENTS 2,744,382 A 5/1956 Benjamin et al.
2,962,184 A 11/1960 Meier
(Continued)

FOREIGN PATENT DOCUMENTS

DE 102019212436 A1 * 10/2020 ................ B64F 5/20

OTHER PUBLICATIONS

Machine Translation of DE102019212436 (Year: 2026).*
International Search Report issued in PCT/EP2023/078637; mailed Dec. 19, 2023.

*Primary Examiner* — Eldon T Brockman
(74) *Attorney, Agent, or Firm* — Studebaker Brackett PLLC

(57) ABSTRACT

An aircraft engine seal apparatus has an inflatable seal with a front wall, a rear wall and a side wall forming a rim for pressing and sealing against an internal surface of an engine intake. There is at least one access hatch which is openable to allow access into a cavity behind the seal in use. Each access hatch has a structure with a liner extending from the front wall to the rear wall and defining a passageway through the seal, and a door or cover which seals against said structure when closed. The hatch liner may have sections of flexible plastics material which are sealed together with overlap in a circumferential direction to form a liner having a convex shape facing into the passage. The sections are trained through the front and rear flanges. A front flange is adhered to a front surface of the front wall around an aperture in the front wall, and the rear flange is likewise adhered to a rear surface of the rear wall. Flexible lanyard connectors are provided for safety and flexible tabs provide a visual guide for insertion depth into the engine intake. The hatches allow very convenient insertion of a tube of a drier and/or insertion and removal of desiccant bags.

18 Claims, 16 Drawing Sheets

(56) References Cited

U.S. PATENT DOCUMENTS

Figure 1:
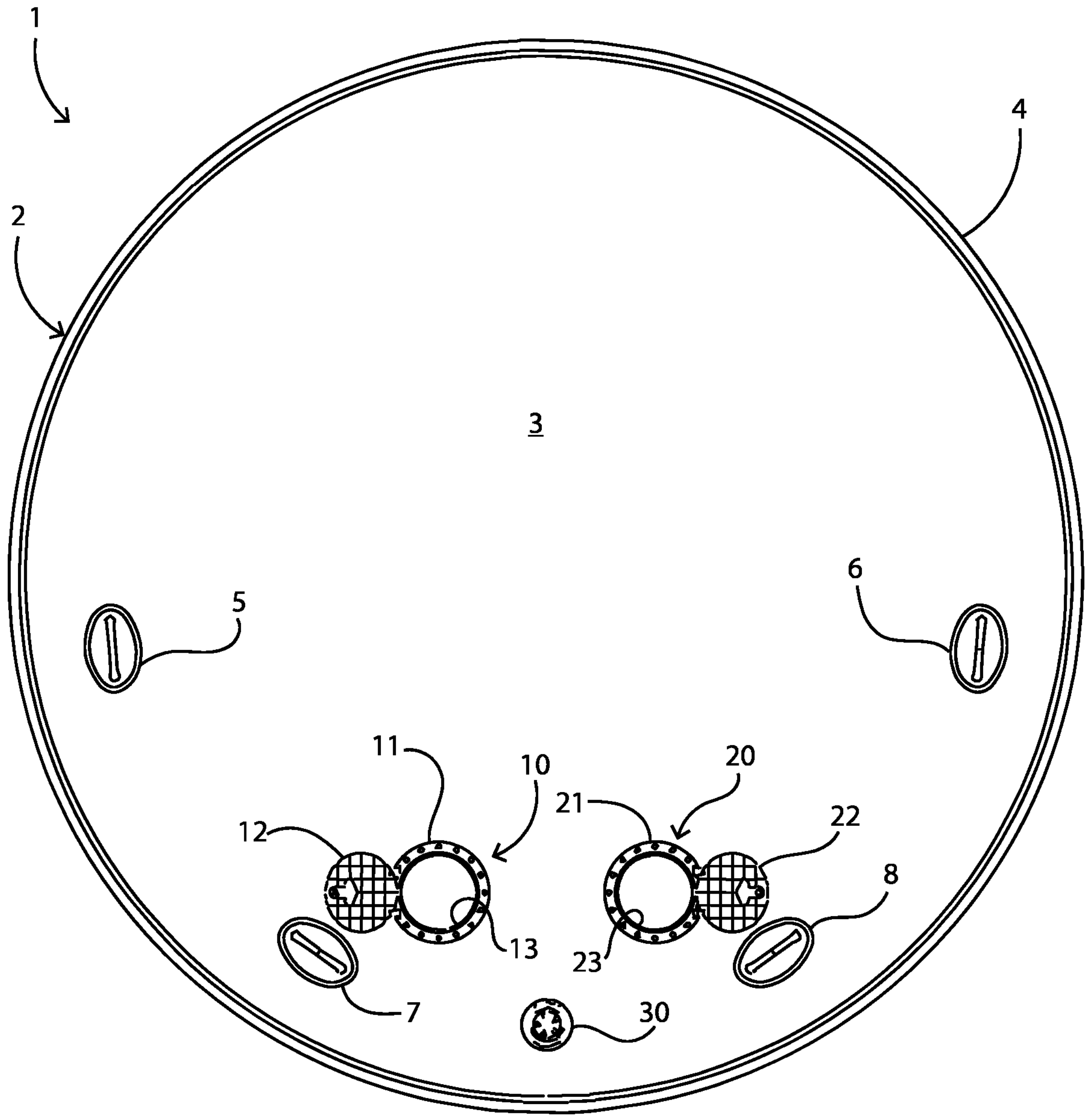

| | | | | |
|---|---|---|---|---|
| 3,000,533 | A | 9/1961 | Jodock | |
| 3,115,010 | A | 12/1963 | Collier | |
| 8,777,154 | B2 * | 7/2014 | Alexander | B64F 1/005 89/1.817 |
| 9,446,857 | B2 * | 9/2016 | Sparks | B64F 1/005 |
| 2014/0008497 | A1 * | 1/2014 | Alexander | B64F 1/005 60/39.093 |
| 2015/0089879 | A1 * | 4/2015 | Sparks | B64F 1/005 49/460 |

* cited by examiner

AIRCRAFT ENGINE SEAL APPARATUS

The present invention relates to seals for aircraft engines, for example to minimise the extent of moisture ingress.

When aircraft engines are not in use condensation can form within the engine cavity and nacelle area. This condensation can cause significant corrosion of the engine and can also degrade various protective finishes within the nacelle area.

In order to minimise this condensation engine manufacturers issue specific maintenance procedures which must be followed by the aircraft operators when aircraft are being parked or stored for prolonged periods. During these periods the manufacturers mandate that bags of silica gel desiccant complete with a humidity indication strip should be placed on a protective membrane within the engine cavity and that protective membranes should be fixed to the intake and exhaust areas of the engine to prevent moisture ingress. These membranes are typically manufactured from a tarpaulin type material which is draped over the intake and exhaust areas and held in place with webbing straps and buckles.

It is necessary for the aircraft operator to remove these membranes regularly in order to check the humidity indicator strip and to replace the desiccant bags if necessary. This is a very time-consuming exercise as the covers which are currently in use are large and heavy and can be very difficult to handle, especially in inclement weather. Furthermore, such covers can themselves cause damage to the engine as they flex and move in high winds, causing friction. This friction can cause significant paint and lip skin coating damage which can in extreme cases prevent the aircraft from being returned to service.

It is known to provide a seal cover or membrane which is mounted to extend across an engine intake. A product marketed by JB Roche under the name FLASHPLUG® is inflatable and seals around within the lip skin area of the engine intake. While this product addresses the problem of damaging the engine paintwork or lip skin, it is still a laborious task to deflate the product in order to remove and replace the desiccant bags and the product must then be repositioned and reinflated.

The invention is therefore directed towards providing an improved aircraft engine seal apparatus.

SUMMARY OF THE INVENTION

We describe an aircraft engine seal apparatus comprising an inflatable seal with a front wall, a rear wall, and a side wall forming a rim for pressing and sealing against an internal surface of an engine intake, and an inflation port, wherein the apparatus further comprises at least one access hatch which is openable to allow access into a cavity behind the seal in use.

In some preferred examples, at least one said access hatch comprises a structure with a liner extending from the front seal wall to the rear seal wall and defining a passageway through the seal, and a door or cover which seals against said structure when closed. In some preferred examples, the cover or door is hinged to the structure.

In some preferred examples, the structure comprises a flange extending in the plane of the front seal wall.

In some preferred examples, there are at least two access hatches.

In some preferred examples, the door comprises a handle and a recess, in which the handle is rotatable into the recess when not in use and can be pulled outwardly for use.

In some preferred examples, the apparatus comprises a plurality of handles secured to the front wall.

In some preferred examples, the or each hatch is located on a lower part of the front wall adjacent a plurality of the handles and a pneumatic port.

In some preferred examples, the apparatus further comprising a humidity probe which is configured to fit within an access hatch.

In some preferred examples, a door of an access hatch has a window for viewing of said humidity probe to provide a visual indication of humidity in the engine.

In some preferred examples, the apparatus further comprises a holder mounted to the internal wall and being configured to support one or more desiccant bag. Preferably, the holder comprises a mesh bag. The mesh bag may preferably have a lower wall or base of non-porous material to prevent desiccant from coming into contact with an engine intake internal surface.

In some preferred examples, the apparatus further comprises at least one flexible connector secured to the front wall and being configured to extend forwardly and around to an external connector of an engine intake. In some preferred examples, the flexible connector comprises a lanyard terminating in a pin for engagement with said engine external connector. Preferably, the flexible connector further comprises a pocket secured to the front wall and being adapted to house the lanyard when not in use. Preferably, the apparatus comprises at least two flexible connectors located at opposed sides of the seal.

In some preferred examples, the apparatus comprises a flexible tab secured to the front wall adjacent the rim, said tab having a length which matches a desired axial separation of the apparatus front wall from a circumferential reference line around an engine intake.

In some preferred examples, the apparatus comprises a fan mounted between the front and rear walls for forming a negative air pressure within an engine chamber in use, and a power source for the fan, and the power source may include a solar panel.

In some preferred examples, the hatch liner comprises a plurality of sections of flexible plastics material which are sealed together with overlap in a circumferential direction to form a liner from the front wall to the rear wall, said liner having a convex shape facing into the passage, and said liner extending from a front wall flange to a rear wall flange. There are preferably four sections.

In some preferred examples, the front flange is adhered to a front surface of the front wall around an aperture in the front wall, and the rear flange is adhered to a rear surface of the rear wall around an aperture in the rear wall.

In some preferred examples, each section extends through the front flange at an angle to longitudinal and has a front flange portion which is sealed to a front surface of the front flange, and each section also extends at angle to longitudinal through the rear flange and comprises a rear flange portion which is sealed to a rear surface of said rear flange.

In some preferred examples, the apparatus further comprises an annular flexible flange adhered to a front face of the section flange portions and extending radially beyond said section flanges to adhere to the liner flange.

We also describe a method of sealing an aircraft engine when not in use, the method comprising the step of inflating a seal of an apparatus of any preceding claim until the rim engages and seals against the internal surface of an engine intake. The method may include maintaining a desired low humidity around the engine and include the further steps of inserting at least one desiccant bags through the access hatch, closing the hatch, and subsequently replacing said desiccant bag when it is spent by use of the hatch ad without deflating the seal.

The method may comprise the further step of inserting a hose of a drier through an access hatch and drying the engine compartment behind the seal by operation of the drier. The drier may be used before insertion of a desiccant bag, and/or while a desiccant bag is in place behind the seal, and/or after removal of the desiccant bag.

We also describe an aircraft engine seal apparatus comprising an inflatable seal with a front wall, a rear wall, and a side wall forming a rim for pressing and sealing against an internal surface of an engine intake, wherein the apparatus further comprises at least one access hatch which is openable to allow access into a cavity behind the seal in use.

Preferably, at least one said access hatch comprises a structure with a tube extending from the front seal wall to the rear seal wall and defining a passageway through the seal, and a door or cover which seals against said structure when closed.

Preferably, the cover or door is hinged to the structure. Preferably, the structure comprises a flange extending in the plane of the front seal wall. Preferably, there are at least two access hatches.

Preferably, the door comprises a handle and a recess, in which the handle is rotatable into the recess when not in use and can be pulled outwardly for use. Preferably, there are two or more access hatches. Preferably, the hatches are located on a lower part of the front wall, adjacent at least some of the handles and the pneumatic port.

Preferably, the apparatus further comprises a humidity probe which is configured to fit within an access hatch. Preferably, a door of an access hatch has a window for viewing of said humidity probe to provide a visual indication of humidity in the engine, and/or the probe fills the cross-sectional area of a hatch and there is no door.

Preferably, the apparatus further comprises a holder mounted to the internal wall and being configured to support one or more desiccant bag. Preferably, the holder comprises a mesh bag.

Preferably, the mesh bag has a lower wall or base of non-porous material to prevent desiccant from coming into contact with an engine intake internal surface.

We also describe a method of maintaining a desired low humidity environment in an aircraft engine when not in use, the method comprising the step of inflating a seal of an apparatus of any example described herein until the rim engages and seals against the internal surface of an engine intake.

Preferably, the method comprises the further steps of, in any order, inserting at least one desiccant bag through an access hatch, closing the hatch, and subsequently replacing said desiccant bag when it is spent by use of the hatch, without deflating the seal.

The method may comprise the further step of inserting a hose of a drier through an access hatch and drying the engine compartment behind the seal by operation of the drier.

In various examples said drier is used before insertion of a desiccant bag, and/or while a desiccant bag is in place behind the seal, and/or after removal of the desiccant bag.

DETAILED DESCRIPTION OF THE INVENTION

Figure 2:
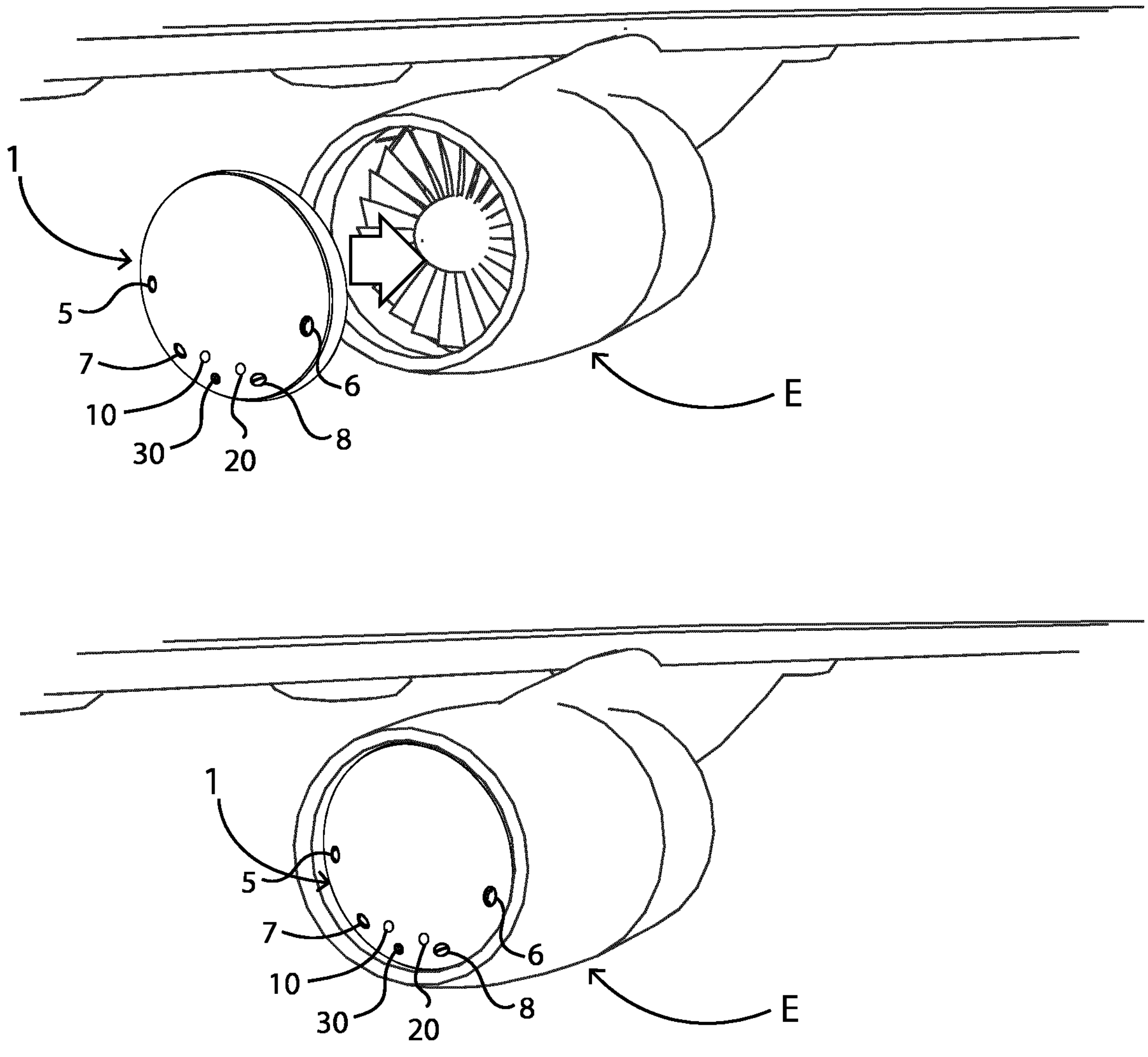
Figure 3:
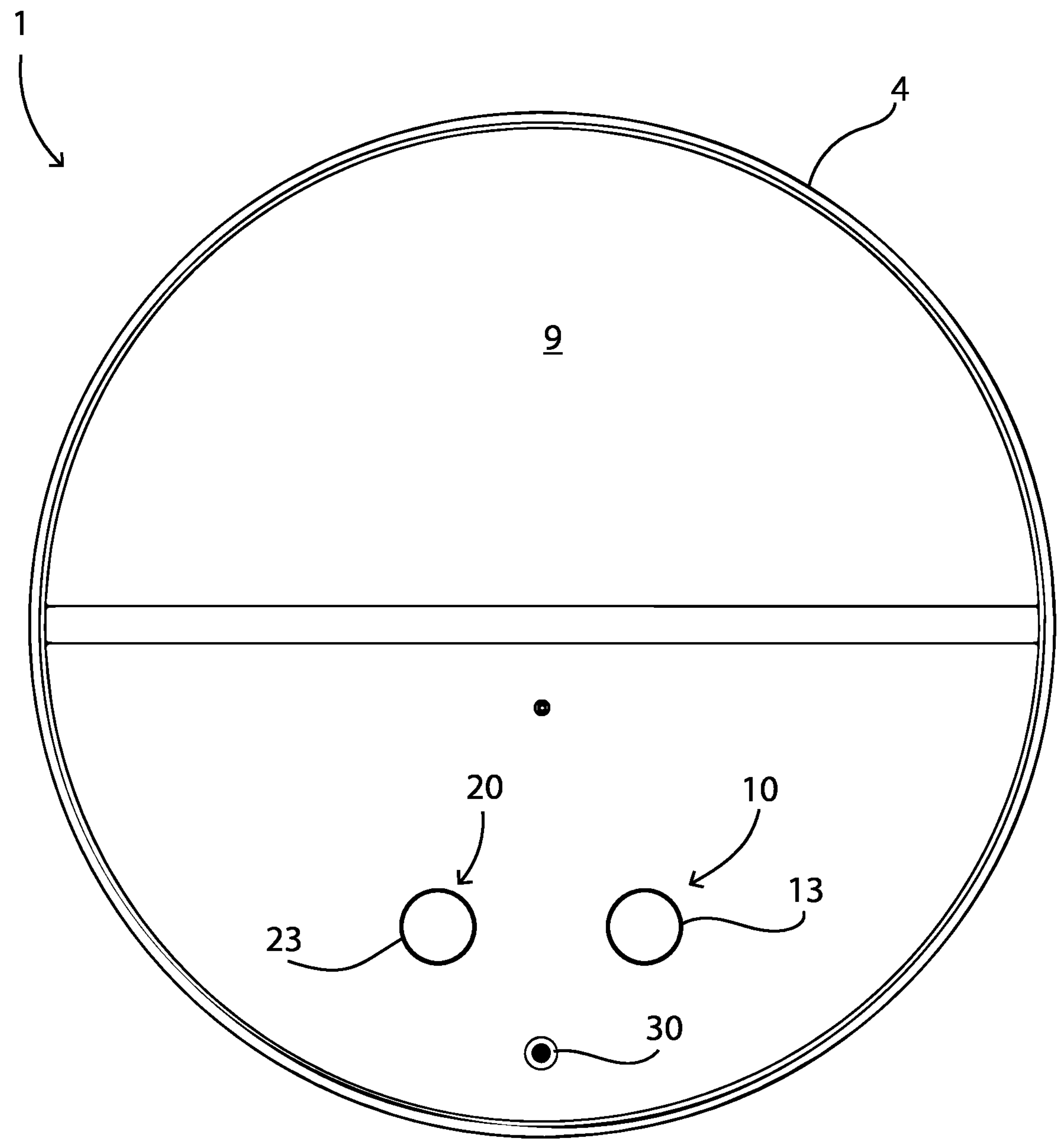
Figure 4:
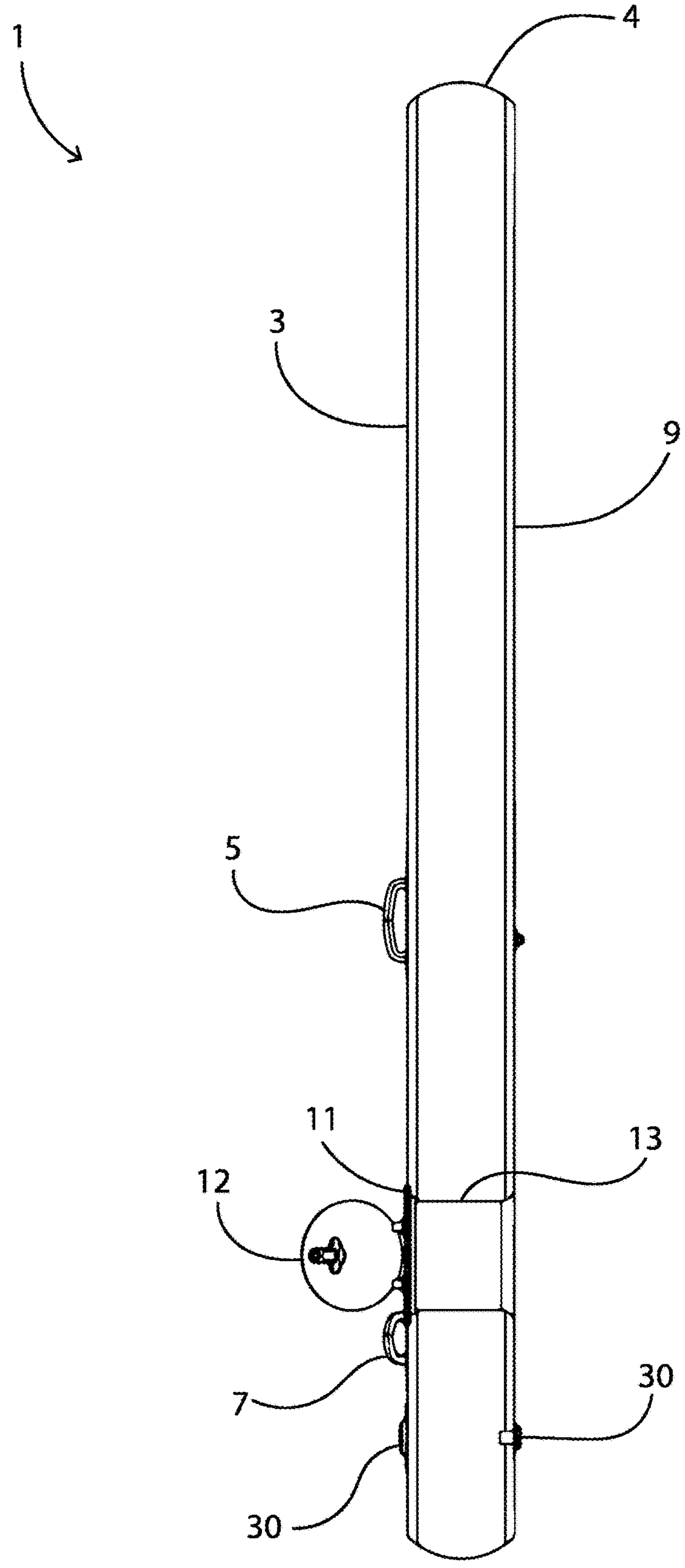
Figure 5:
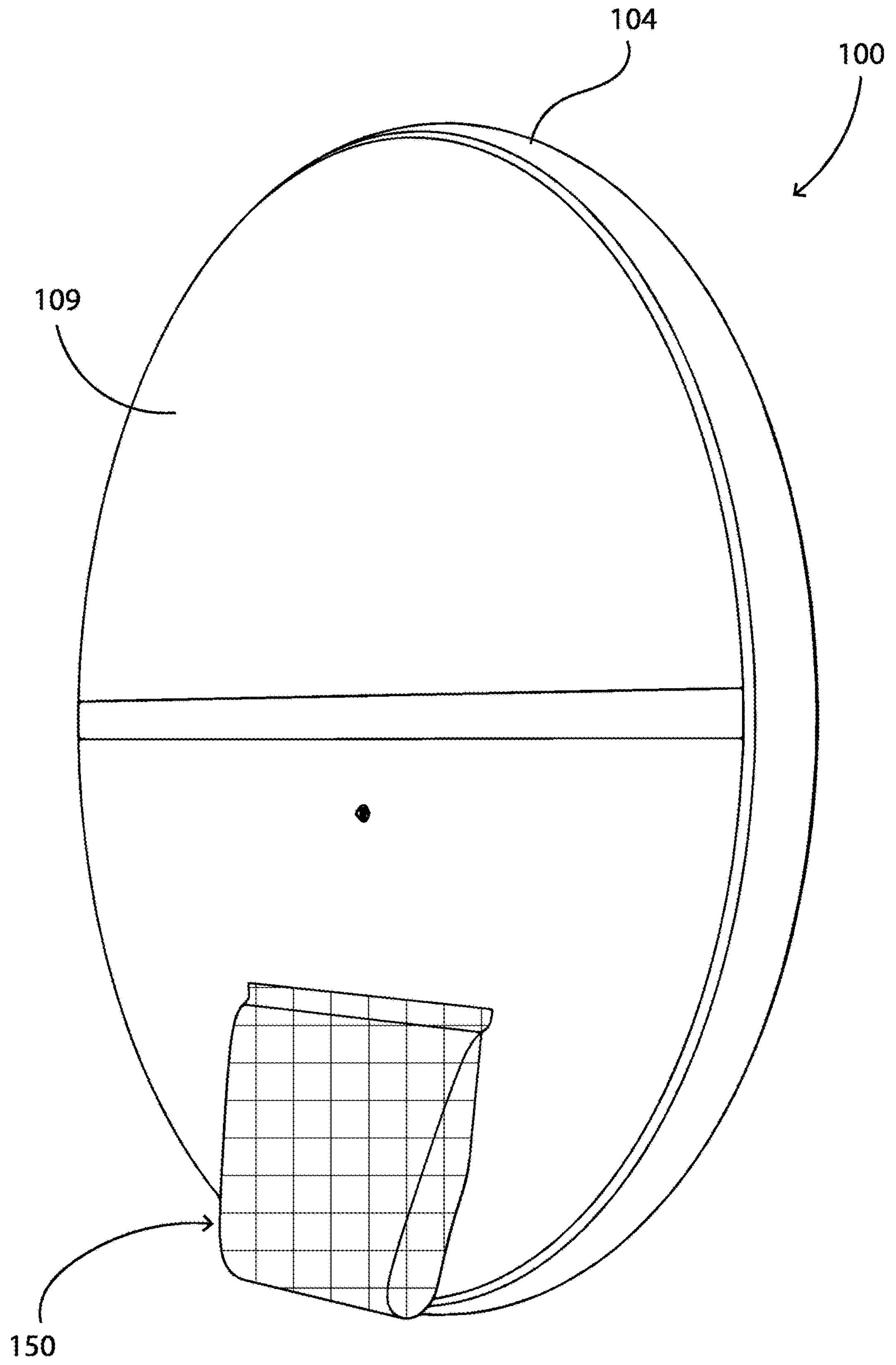
Figure 6:
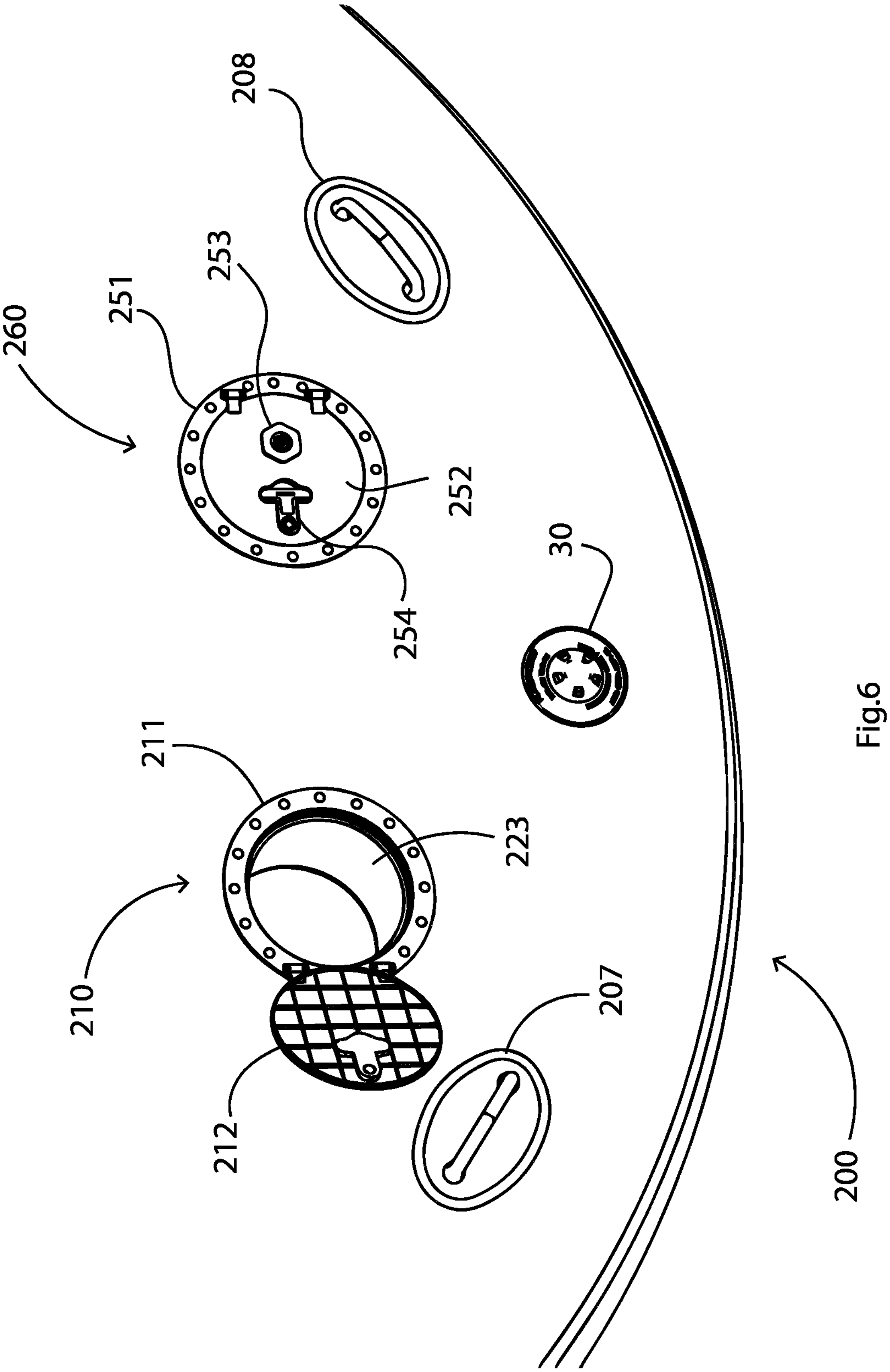
Figure 7:
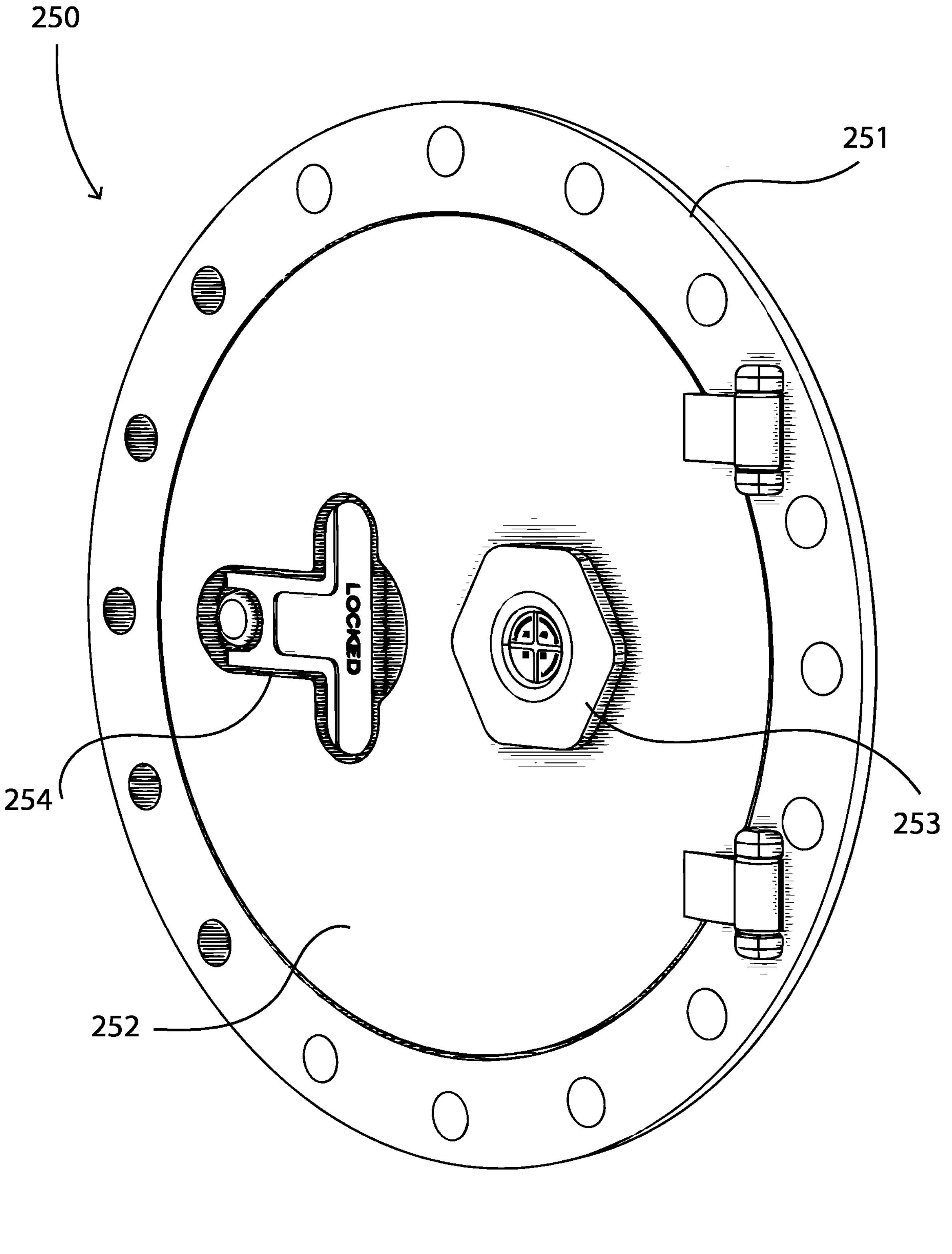
Figure 8:
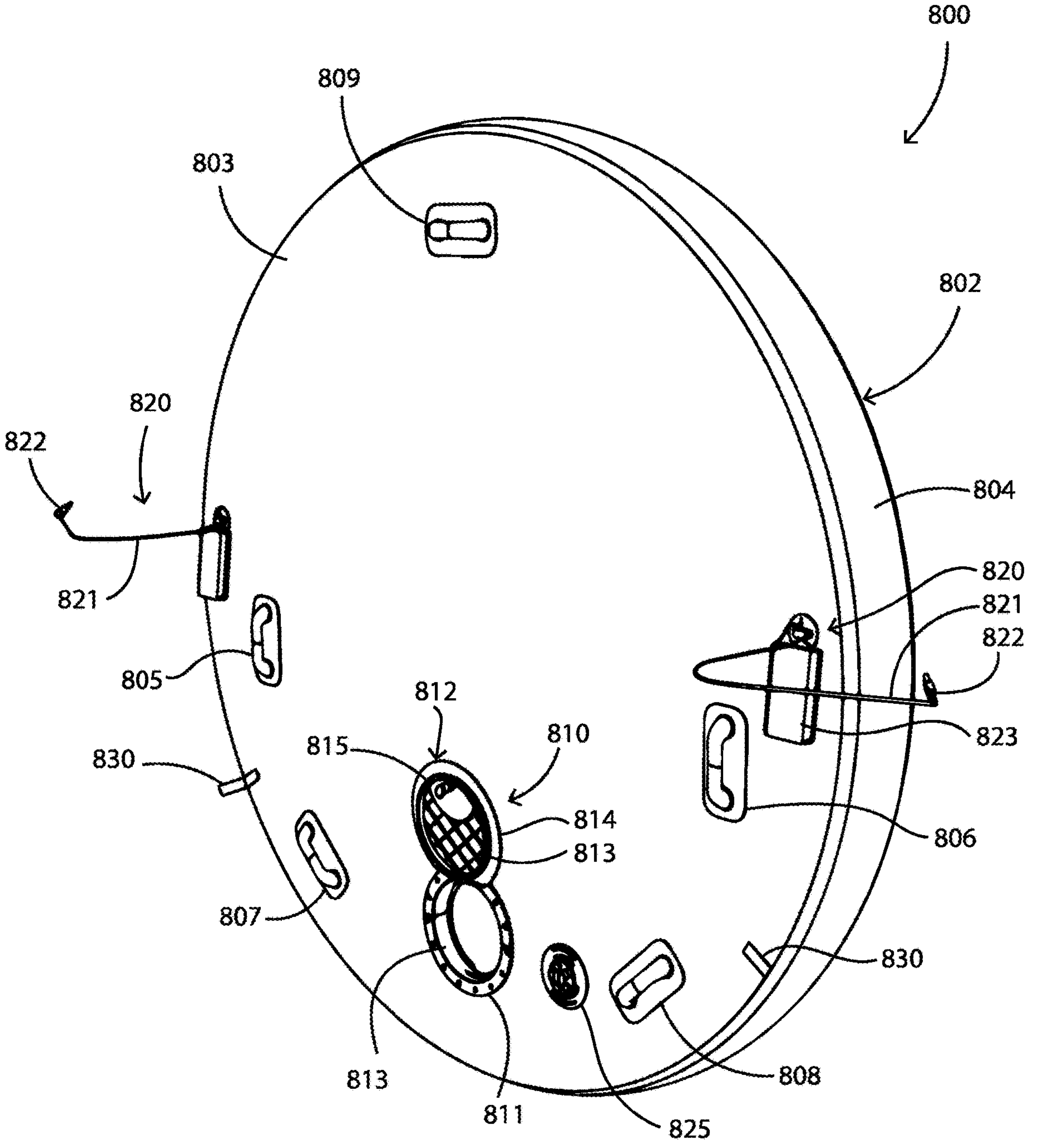
Figure 9:
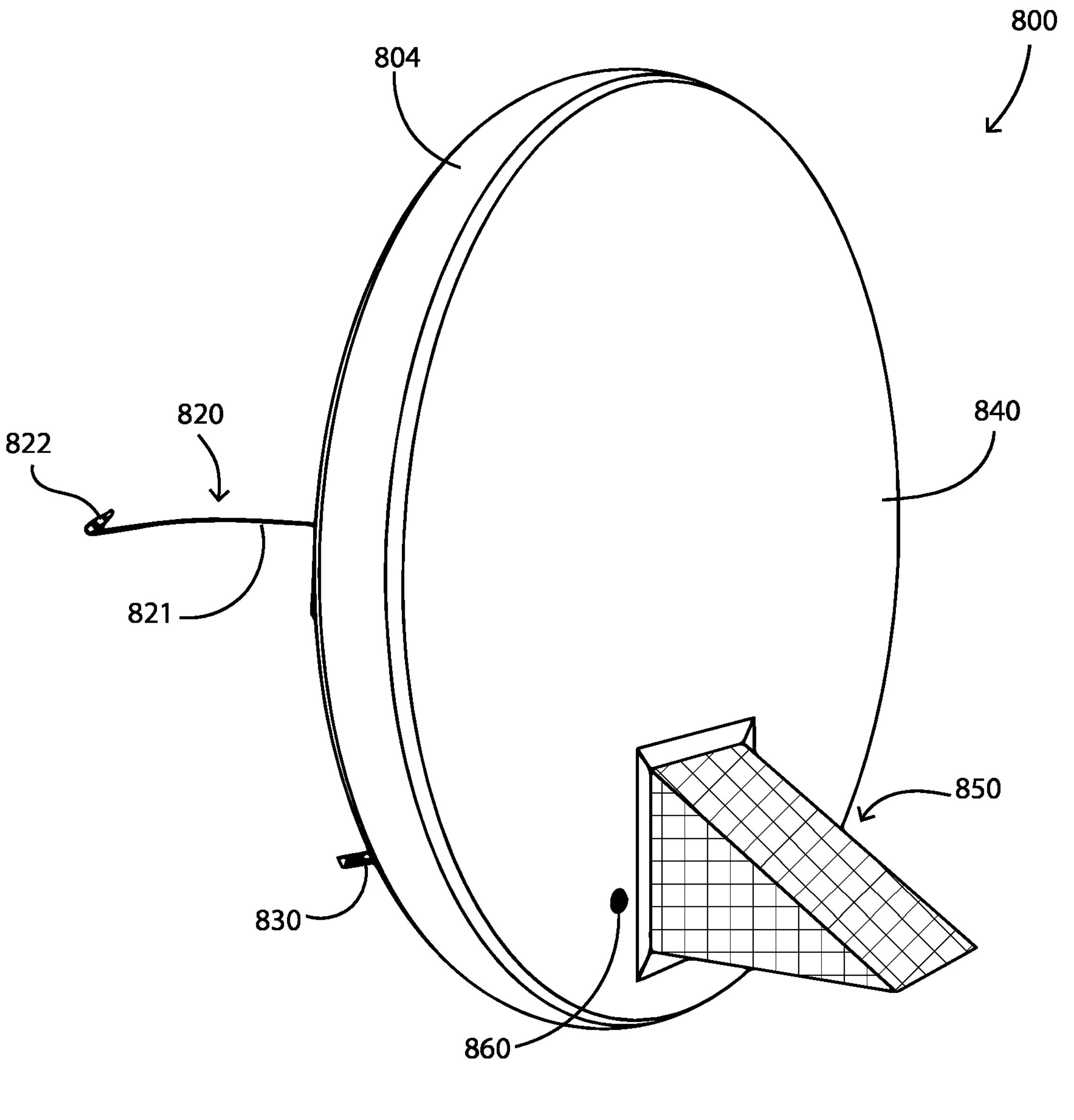
Figure 10:
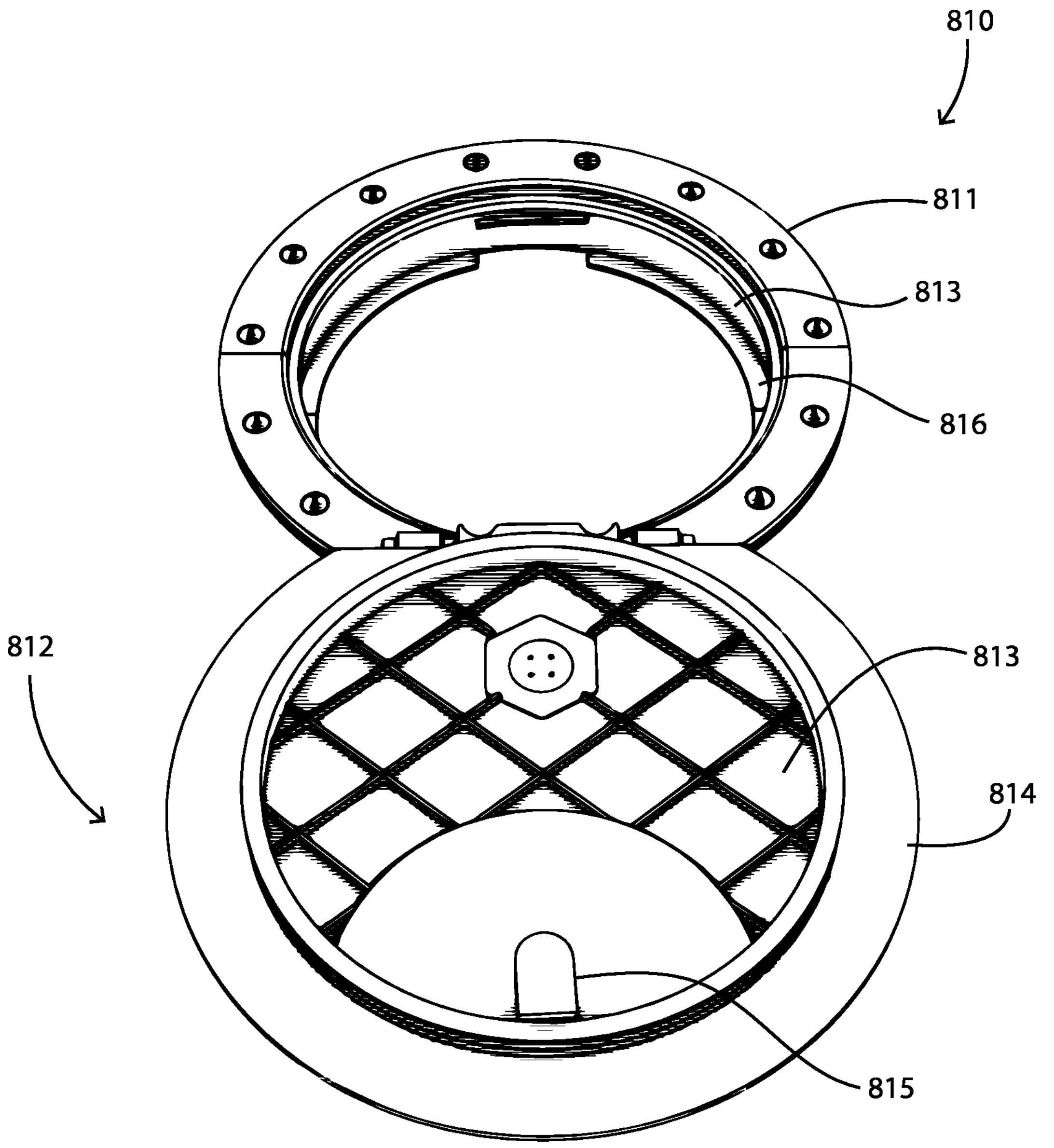
Figure 11:
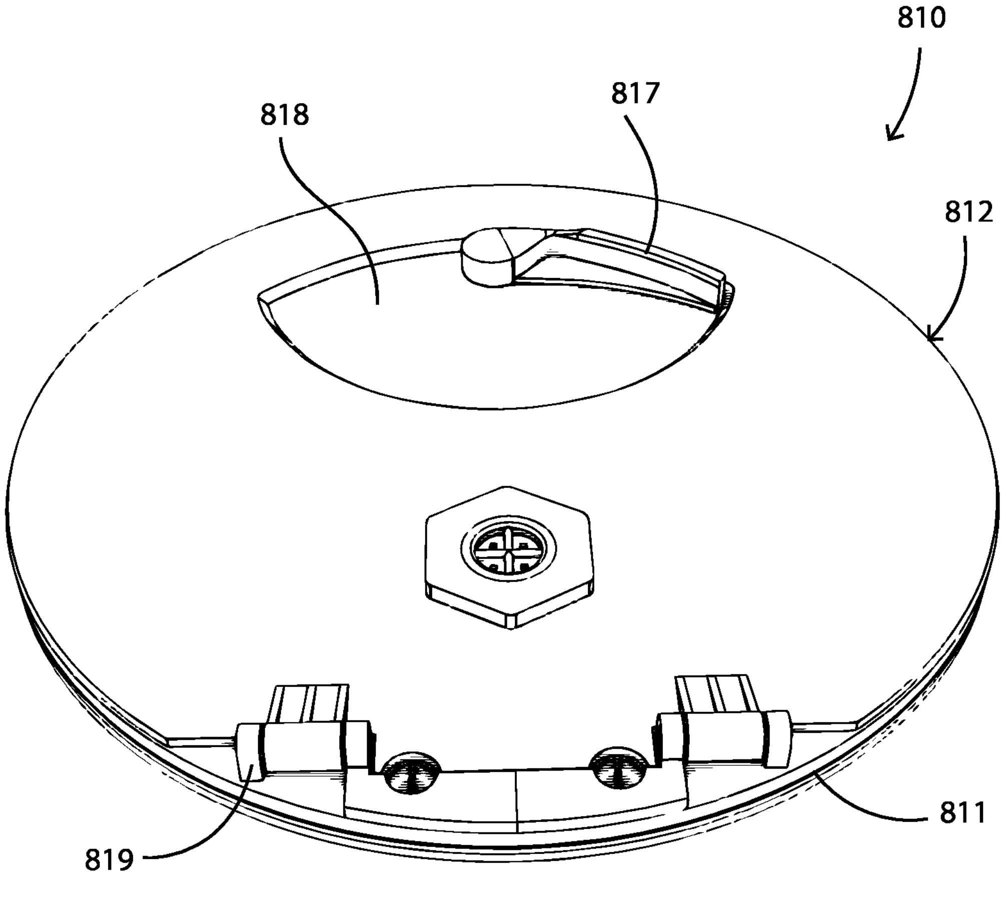
Figure 12:
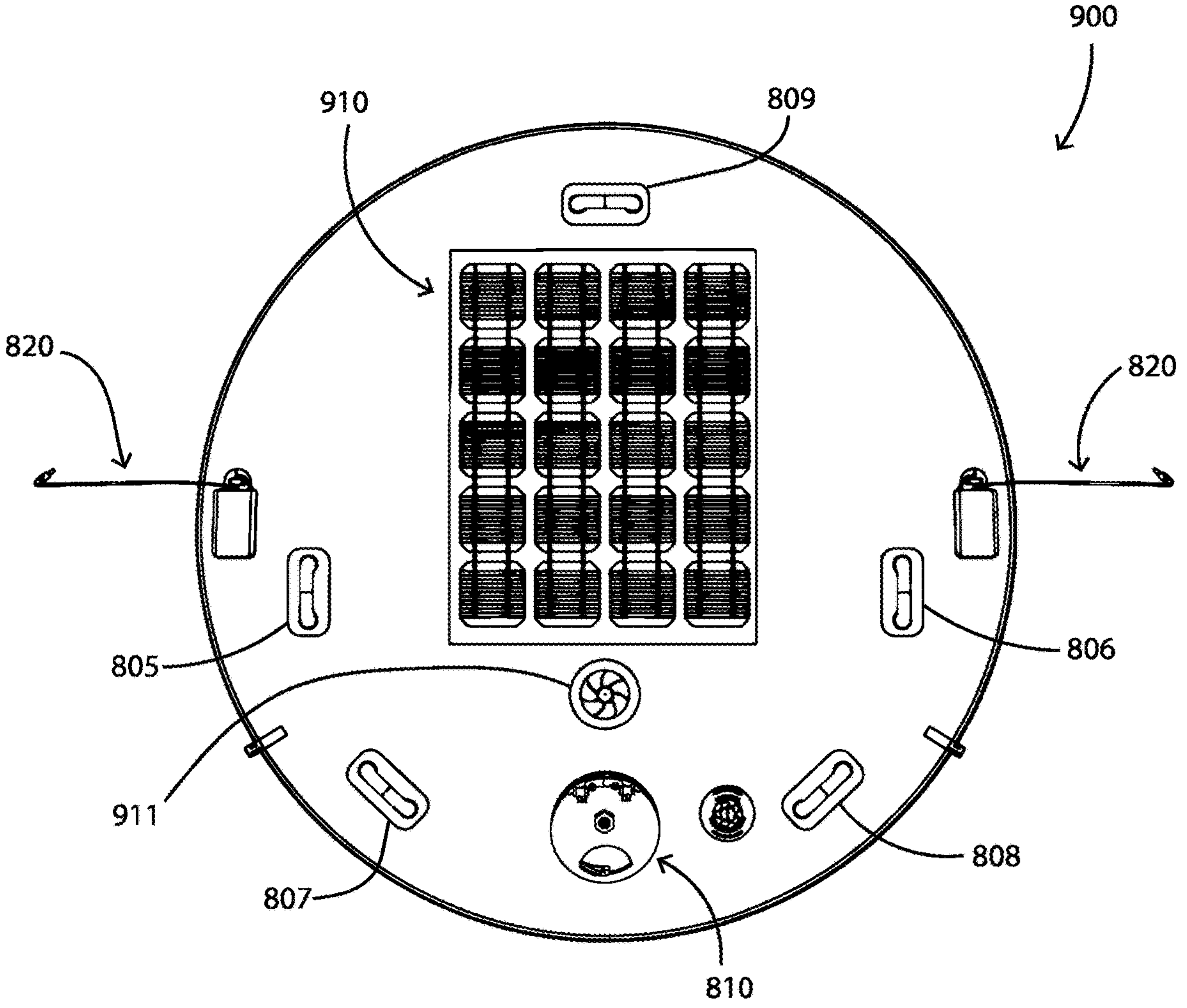
Figure 13:
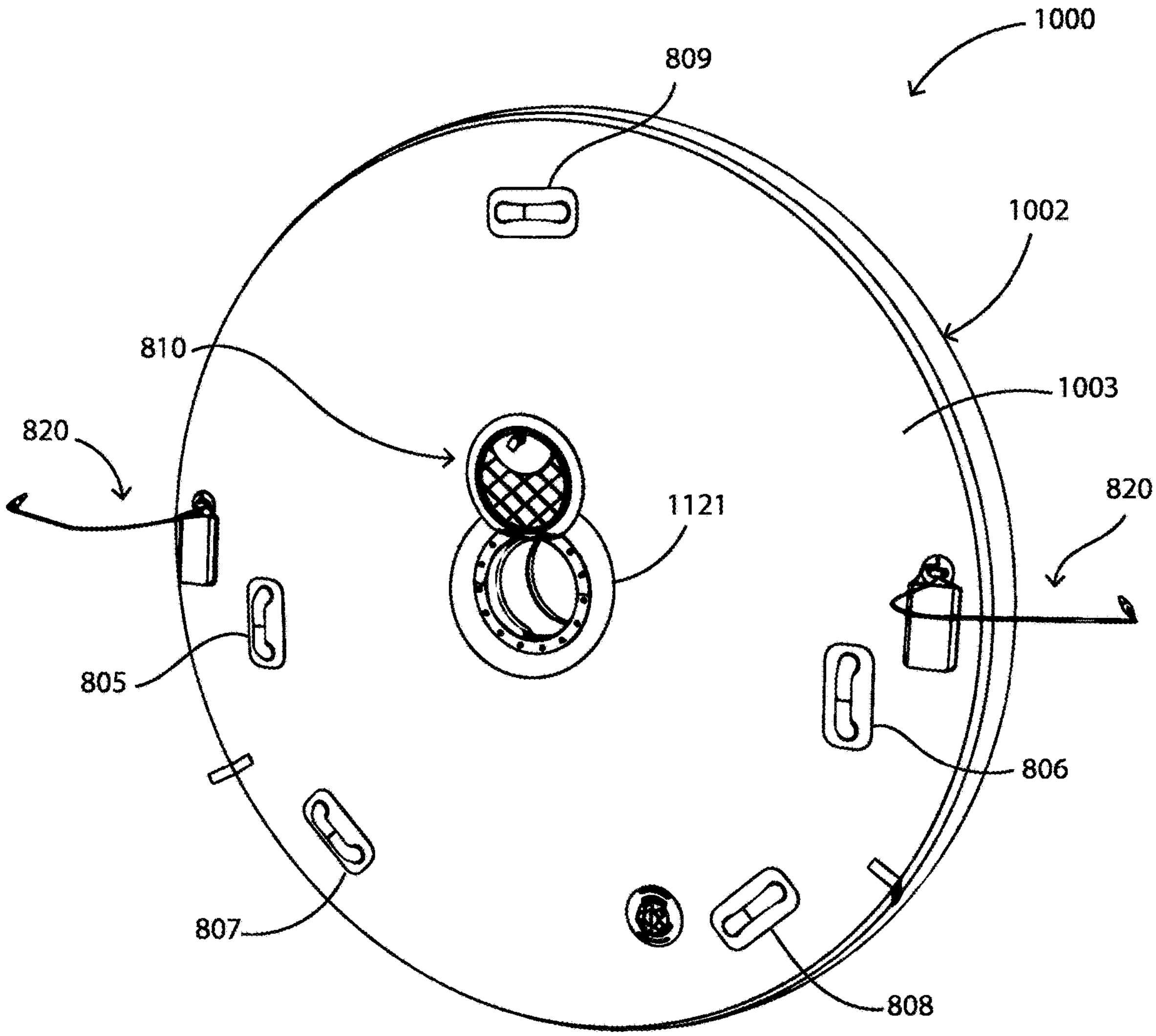
Figure 14:
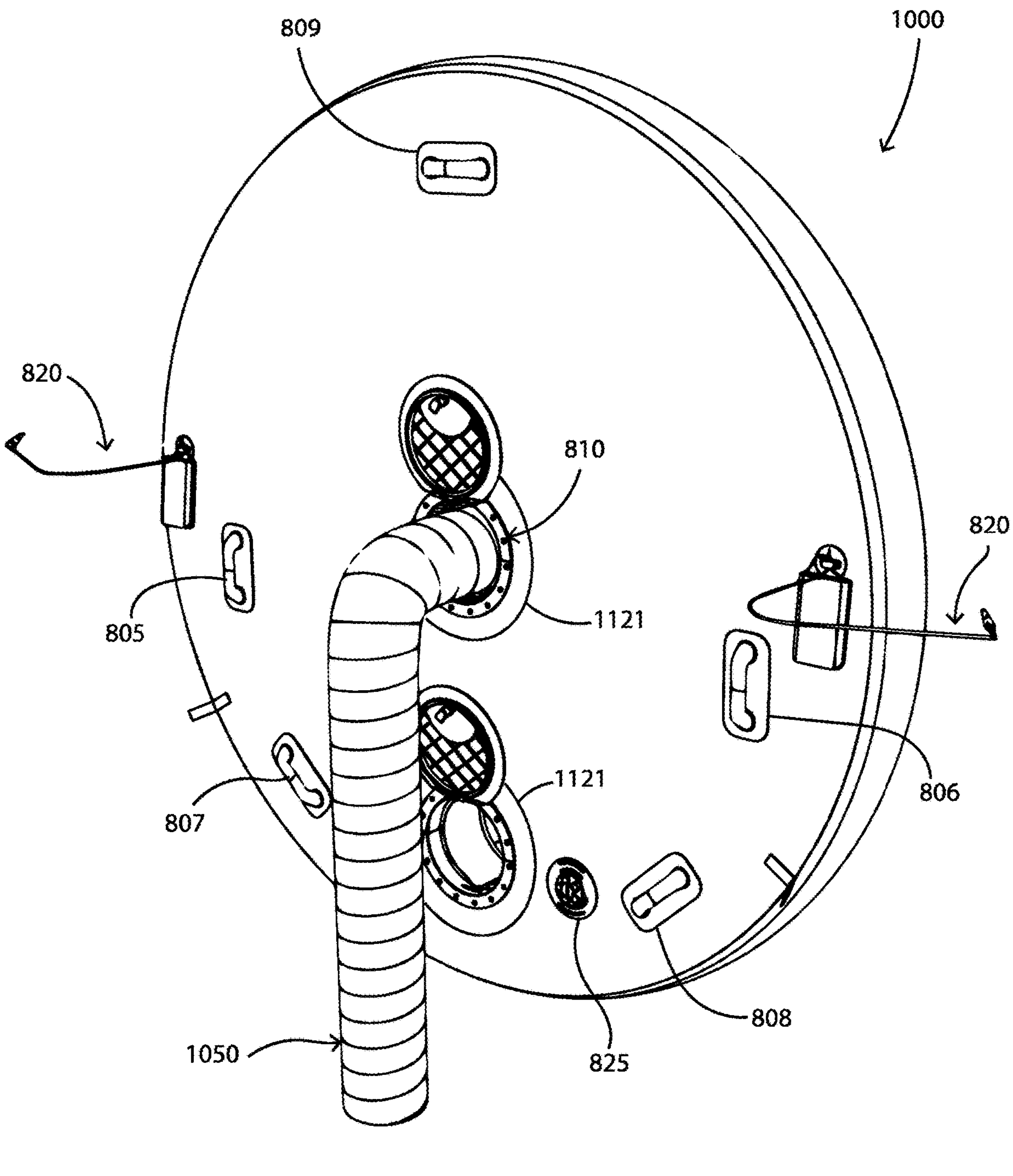
Figure 15:
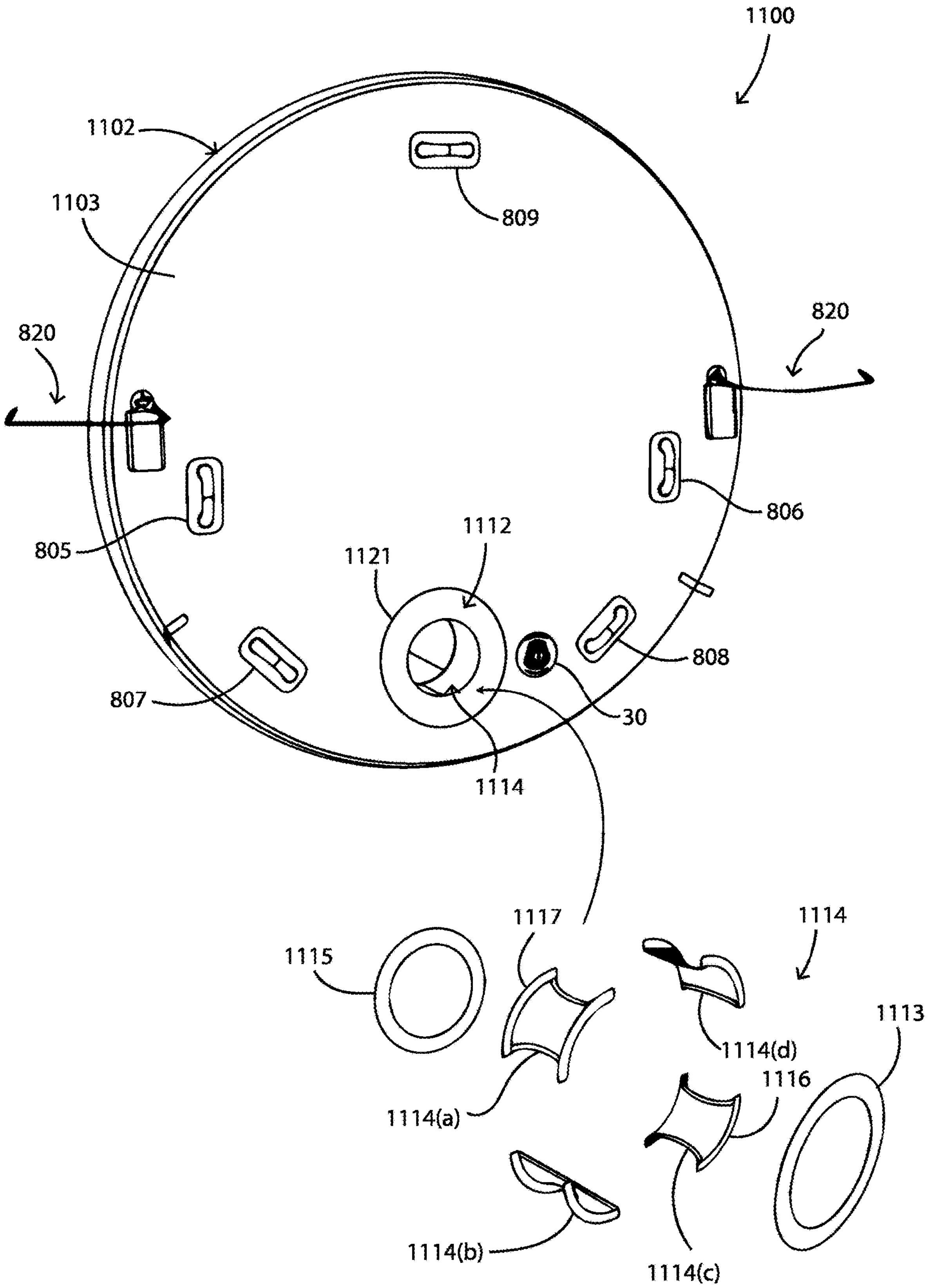
Figure 16A:
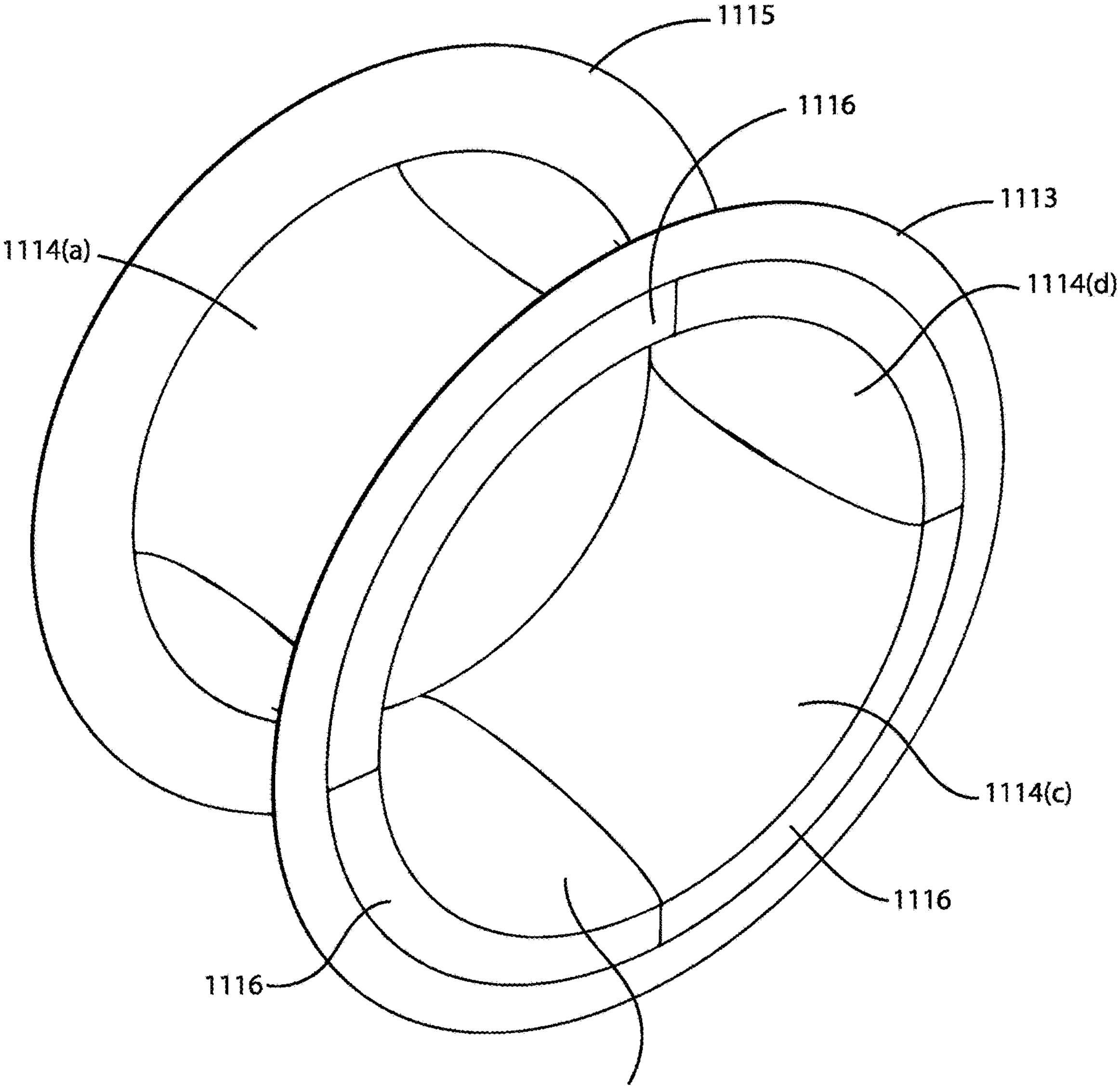
Figure 16B:
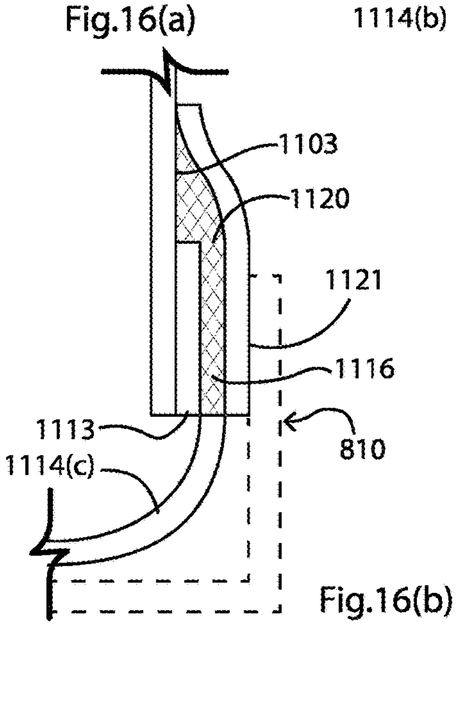

The invention will be more clearly understood from the following description of some embodiments thereof, given by way of example only with reference to the accompanying drawings in which:

FIG. 1 is a front view of an aircraft engine seal apparatus of the invention, and FIG. 2 shows perspective views showing the seal apparatus being applied and in use, FIG. 3 is a rear elevational view of the apparatus, FIG. 4 is a sectional side view through the apparatus, with particular detail of an access hatch, FIG. 5 is a rear perspective view of an alternative seal apparatus, in this case having a mesh holder for a desiccant, in use, and FIG. 6 is a perspective view of part of an alternative seal apparatus, in this case having a humidity probe, and FIG. 7 is an enlarged perspective view of the hatch door incorporating the probe, FIG. 8 is a perspective view from the front of an alternative apparatus, in this case including safety lanyards and visual insertion distance guides, and FIG. 9 is a rear perspective view of this apparatus, FIG. 10 is a perspective view showing the hatch door when open, and FIG. 11 when closed, FIG. 12 is a front view of an alternative apparatus in this case having a vacuum pump and solar panels for the pump, FIG. 13 is a front perspective view of an alternative apparatus which is particularly suited to engine cleaning, and FIG. 14 is a front view showing the situation when a detergent vapour hose is linked to the hatch, FIG. 15 is a perspective front view of another apparatus having a hatch with a liner for flexible material forming a convex shape when the apparatus is inflated, FIG. 16(*a*) is an enlarged view of the hatch liner, and FIG. 16(*b*) is a diagrammatic cross-sectional view through the layers of material at the front flange of the liner, not to scale.

DETAILED DESCRIPTION OF THE INVENTION

Referring to FIGS. 1 to 4 an aircraft engine seal apparatus 1 comprises, when in use, a disc-shaped inflated seal with a front wall 3, a side wall or rim 4, and a rear wall 9. The walls are sized so that the apparatus fits comfortably within the intake of the target engine, as shown particularly in FIG. 2. The front and rear walls 3 and 9 are manufactured in an integrated manner from a drop-stitch fabric, in which each of the walls 3 and 9 has an outer plastics airtight layer and an inner fused nylon or polyester fabric which has fabric threads extending across the depth of the seal apparatus to the inner fused fabric of the other wall. This is of the type known for inflatable water-borne craft, the drop stitch arrangement allowing the front and rear walls to have a uniform separation in a manner which provides rigidity to the apparatus 1.

The front side of the apparatus 1 comprises handles 5, 6, 7, and 8 located for ease of gripping by a person standing at the intake. There is also a pneumatic inflation port 30, which is conventional.

The apparatus 1 also comprises two access hatches 10 and 20. The hatch 10 has a flange 11 on the front side, extending from a tube 13. A disc-shaped door 12 is hinged to the flange 11. The liner or tube 13 and the flange 11 form a structure for the access hatch, which structure is sealed around the tube 13. The door 12 is configured to close with a friction fit seal within the flange 11. The hatch 20 is in this embodiment similar, having a flange 21, a hinged door 22, and a tube 23. As shown in FIG. 4 the liner or tube 13 terminates on the inside wall 9 with a flared shape, and the hatch 20 tube 23 is similar. Each door 12 and 22 has a handle which has a home position in a recess or cradle in the door and an operative position when pulled out by a user.

FIG. 2 shows the apparatus when partly inflated, and after insertion into the engine (E) intake and after full inflation so that the rim 4 is fully engaged against the internal surface of the engine (E) intake. In other examples the apparatus is only inflated when it is within the engine intake. FIG. 3 shows the apparatus 1 from the rear.

As is clear particularly from FIG. 4, after installation in an engine intake the hatch door 12 and/or 22 may be opened, and the access provided through the tube of the hatch may be used for a desired function such as inserting or removing desiccant bags. It may also be used for access by a tube of a drier to reduce humidity within the engine area behind the apparatus 1. In general, it is desired to maintain relative humidity in this space at or below 45%.

It will be appreciated that the hatches 10 and 20 may be easily used for the desired purpose, thereby optimising effectiveness of the dry environment which is maintained in the engine. This is achieved by, for example, regularly refreshing the desiccant bags used. It is of course very simple to re-close the hatches 10 and 20 after use. As each door 12 and 22 has an O-ring, not shown, around its rim there is a very effective seal when closed. In one advantageous use, hoses are introduced through the open hatches and attached to a dehumidifier in order to dry the engine, and the desiccant bags are then replaced with fresh desiccant and the hatches closed.

There may be a Bluetooth electronic humidity indicator in the cavity, such as being attached to the inside surface of the wall 9 (facing towards the engine in use), to provide a continuous record of humidity levels within the engine. This may be suspended from the inside of the apparatus or in a mesh bag.

As shown in FIG. 5 a seal apparatus 100 has a rear wall 109 and a rim 104, and the rear wall 109 supports a mesh bag 150 to hold bags of desiccant. The bottom of this bag is made non-porous so that no additional protective material needs to be placed in the engine intake area (to prevent direct contact between the desiccant bags and the acoustic panel of the engine). In this case there is one hatch, akin to the hatches 10 and 20, and it is hidden in this view by the bag 150. The hatch allows desiccant bags to be inserted and removed directly to and from the bag 150.

Referring to FIGS. 6 and 7 any embodiment may have a humidity probe inserted in a tubular housing akin to that of the hatches 10 and 20. These drawings illustrate part of a seal apparatus 200 having an access hatch 210 with a flange 211 supporting a hinged door 212 and having a tube 223 running longitudinally through the depth of the apparatus from the front face to the rear face. An access hatch 260 has a similar housing structure, a flange 251 and a door 252 being visible in FIGS. 6 and 7. The door 252 is locked by means of a simple spring loaded “Twist and Push to Lock” mechanism 254. The doors 12 and 22 of the apparatus 1 have a similar handle/lock mechanism.

In this case the tube of the hatch 260 encloses a probe 253 which is visible through the door to provide a visible indication of humidity in the engine environment in use. The probe provides a visual indication of humidity according to chemical reactions in its porous substrate. As shown in FIG. 7 the visual indicator is in four quadrants, the number of quadrants changing colour indicting the humidity.

In another embodiment, the apparatus includes a removable probe which fits within an access hatch. Such a probe may provide a visible indication upon opening of the door, or the door may have a window for viewing the probe, or the probe may completely fill the cross-sectional area of the hatch and so seal it without use of a door.

It will be appreciated that the seal apparatus of the invention provides major advantages for use, allowing regular maintenance of a low humidity environment in a simple manner.

It is possible to insert a humidity indication strip into the access hatch, so that it is possible to check whether the desiccant is in need of replacement by visual means alone. A more comprehensive humidity sensor may be mounted as shown in FIGS. 6 and 7 so that a hatch is dedicated to this purpose.

If the desiccant does need replacing the apparatus does not need to be deflated or moved; the desiccant bags can be simply replaced through the access hatches.

As drying hoses can be introduced through the access hatches it is possible dry out the engine more thoroughly prior to placing the desiccant. The reduces the amount of silica gel required and reduces inspection times.

When the optional mesh bag 150 is employed further material and time savings can be expected as a separate protective sheet does not need to be used to protect the engine from coming into contact with the desiccant.

Referring to FIGS. 8 to 11 an apparatus 800 has an inflatable seal provided by a front wall 803, a rim 804, and a rear wall 840. Again, these are manufactured by drop stitching, with nylon or polyester threads extending back-and-forth across the internal cavity between the front and rear walls 803 and 809 to provide a disc-shaped rigid structure when inflated via a standard inflation port 825. There are four handles 805, 806, 807, and 808 in the same positions as the handles 5, 6, 7, and 8 of the apparatus 100 and in this case there is a single access hatch 810 close to the lower end in use. In this case there is also a fifth handle, 809, located near the top and this is to allow handling where the apparatus has a diameter of more than 1.5 m, and it is envisaged that a stabilising rope may be trained through the handle 809 to assist lifting and positioning the apparatus when partly inflated, especially in windy conditions.

The apparatus 800 has a mesh bag 850 secured to the rear wall 840 for holding desiccant bags.

The apparatus 800 also comprises a pair of safety ties 820, on eon each lateral side. Each tie 820 comprises a lanyard 821 terminating in a pin 822, and the lanyard has sufficient length so that it may be trained forwardly and around the rim of the engine to an outside location at which the pin is engaged in a socket. This helps to secure the apparatus in place, preventing it from falling towards the engine in the event of a fault causing loss of inflation. The flexible connector further comprises a pocket 823 secured to the front wall and being adapted to house the lanyard (821) when not in use.

Additionally, the apparatus 800 has a pair of tabs formed from short lengths (c. 6 cm) extending from the front edge of the rim 804, each providing a visual guide for installation. The tab 830 should extend to a circumferential reference line around the inside of the engine, and when this is the case, the operator can be certain that the apparatus 800 in in the correct location.

FIGS. 10 and 11 show the access hatch 810 in more detail. It comprises a front flange 811, a tube 813, a rear rim 816 extending radially inwardly from the tube 813, and a door hinged by a hinge 819 to the flange 811. The door 812 has and having a main body 813 with ribs for strength and a rim 814 for engaging the flange 811. There is a lock 815 which is rotated on the outside by a handle 817 which rotates in a recess 818 of the door body. It will be appreciated that this is a simple and effective manner of sealing the hatch. In other embodiments the door may be lockable, if required, by a more secure lock.

Referring to FIG. 12 an alternative apparatus 900 has some parts the same as those of the apparatus 800 and like parts are given the same reference numerals. In this case there is a solar panel 910 to provide power when the apparatus is used outdoors, and it includes a rechargeable battery powering a small fan 911 to maintain a negative pressure within the engine when the seal is in place. In other embodiments there is a fan without any solar power function, this being driven by either primary batteries or directly from the mains via an adapter.

Referring to FIGS. 13 and 14 an apparatus 1000 again has some components the same as earlier embodiments and like parts are given the same reference numerals. In this case the access hatch 810 is located on-axis centrally in the apparatus. It may be used for injection of a vapourised detergent composition, and this may assist self-cleaning of the engine when it is next run, to remove carbon and thereby improve efficiency.

FIG. 14 shows a detergent tube 1050 leading to the hatch 810. It is pressed into the liner 813 with a friction fit to the extent of the rear rim 816. In this use, the apparatus 1000 seals the engine chamber and allows injection on-axis of a detergent. Provided the engine is used shortly afterwards the moisture provided by the detergent will not be a problem and will in fact contribute to removal of Carbon deposits as the engine is used. Such removal of Carbon deposits contributes to engine efficiency.

Reference is now made to FIGS. 15 and 16 in which an apparatus 1100 is shown, and again like parts are given the same reference numerals. The apparatus 1100 has a seal 1102 provided by a front wall 1103, a rear wall (not shown), a seal rim in an arrangement generally similar to the other embodiments. Again, these are of drop stitch manufacture. An access hatch is in a lower portion of the seal 1102. The hatch has a door 812, which is not shown in these drawings, and the portion which is shown is indicated by the numeral 1112. A front flange 1113 is sealed by welding to the front surface of the front wall 1103, in a flat planar adhesive interface around a hole in the wall 1103 material.

The hatch 1112 also comprises a liner 1114 extending across the seal 1102 from the front flange 1113 to a rear flange 1115, and the rear flange 1115 is sealed to the rear wall. The liner 1114 is manufactured from four saddle-shaped sections of flexible plastics material, which are shaped to form a convex shape facing into the hatch's passage when the seal 1102 is inflated. Each section 1114(*a*), 1114(*b*), 1114(*c*), and 1114(*d*) is saddle-shaped and forms an arc around slightly more than 90° in front view. When they are overlapped at their circumferential edges and sealed by welding, they form a liner forming a passageway from the front flange 1113 to the rear flange 1115. Each section has a front flange portion 1116 which is shaped as a circumferential arc over about 90° and is sealed by welding to the front face of the front flange 1113. Also, each section has a rear flange portion 1117 which is sealed to the rear surface of the rear flange 1115. Hence the longitudinal ends of each section each extends through a flange 1113/1115 and is turned around so that its flange 1116/1117 is adhered to the respective flange 1113/1115. As shown particularly in FIG. 16(*b*) the material of the section is bent in a curve towards the flange portion 1116, thereby avoiding sharp bends which might be points of failure under the inflation pressure. An annular piece of flexible PVC 1121 is then adhered to the flange portions 1116 and to the flange 1113, and the door is in turn adhered to that surface as shown by interrupted lines.

As shown in FIG. 16(*b*) the flange 1113 is of flexible plastics material with a thickness of 0.7 mm, and the layers 1103, 1116, and 1121 are also of flexible PVC with a similar thickness. The radial dimension f the flange 1121 is, on the other hand, of the order of several cm, preferably 2 cm to 10 cm. This drawing is not to scale, for clarity in showing the layers, and so in practice the outer flange 1121 only bends with very small angle from being bonded to the flange portions 1116 to the seal front wall 1103. The layers provide excellent seals and flexibility to prevent potential cracks and leaks. They also have excellent adherence properties, and in one preferred example the adhesives used are solvent-based polyurethane adhesives.

The arrangement on the rear end of the liner 1114 is the same in terms of the section rear flange portions 1117 being adhered to the rear surface of the rear flange 1115. There may or may not be an annular flexible layer like the layer 1121 on the rear (inside) face.

This arrangement provides for an exceptionally good air-tight seal as air pressure within the seal 1102 exerts pressure to press each section to maintain the convex line shape and to press more tightly against the front and rear flanges 1113 and 1115. It is especially important that leaks are avoided, due to the nature of the use of the apparatus; it is advantageous that there is minimal risk of deflation of the apparatus. It will be appreciated that the apparatus of the invention provides for sealing of an aircraft engine environment in a simple manner, while also allowing access for reasons such as inserting and removing desiccant bags or for injection of a detergent. The apparatus can be left in place for the desired time, which can be in the order of weeks or even months if needed, thereby helping enormously in prevent degradation of an engine while in the hangar for maintenance purposes for example.

Components of embodiments can be employed in other embodiments in a manner as would be understood by a person of ordinary skill in the art. The invention is not limited to the embodiments described but may be varied in construction and detail.

The invention claimed is:

1. An aircraft engine seal apparatus comprising
an inflatable seal with a front wall,
a rear wall, and
a side wall forming a rim for pressing and sealing against an internal surface of an engine intake, and
an inflation port,
at least one access hatch which is openable to allow access into a cavity behind the seal in use,
the at least one said access hatch comprises a structure with a liner extending from the front seal wall to the rear seal wall and defining a passageway through the seal, and a door which seals against said structure when closed, wherein the door is hinged to the structure.

2. The aircraft engine seal apparatus as claimed in claim 1, wherein the door comprises a handle and a recess, in which the handle is rotatable.

3. The aircraft engine seal apparatus of claim 1, wherein the hatch liner comprises a plurality of sections of flexible plastics material which are sealed together with overlap in a circumferential direction to form a liner from the front wall to the rear wall, said liner having a convex shape facing into the passage, and said liner extending from a front wall flange to a rear wall flange.

4. The aircraft engine seal apparatus as claimed in claim 1, wherein the hatch liner comprises a plurality of sections of flexible plastics material which are sealed together with overlap in a circumferential direction to form a liner from the front wall to the rear wall, said liner having a convex shape facing into the passage, and said liner extending from a front wall flange to a rear wall flange; and wherein the front flange is adhered to a front surface of the front wall around an aperture in the front wall, and the rear flange is adhered to a rear surface of the rear wall around an aperture in the rear wall.

5. The aircraft engine seal apparatus of claim 1, wherein the hatch liner comprises a plurality of sections of flexible plastics material which are sealed together with overlap in a circumferential direction to form a liner from the front wall to the rear wall, said liner having a convex shape facing into the passage, and said liner extending from a front wall flange to a rear wall flange; and wherein each section extends through the front flange at an angle to longitudinal and has a front flange portion which is sealed to a front surface of the front flange, and each section also extends at an angle to longitudinal through the rear flange and comprises a rear flange portion which is sealed to a rear surface of said rear flange.

6. The aircraft engine seal apparatus of claim 1, wherein the hatch liner comprises a plurality of sections of flexible plastics material which are sealed together with overlap in a circumferential direction to form a liner from the front wall to the rear wall, said liner having a convex shape facing into the passage, and said liner extending from a front wall flange to a rear wall flange; and wherein the front flange is adhered to a front surface of the front wall around an aperture in the front wall, and the rear flange is adhered to a rear surface of the rear wall around an aperture in the rear wall; and wherein the apparatus further comprises an annular flexible flange adhered to a front face of the section flange portions and extending radially beyond said section flanges to adhere to the liner flange.

7. An aircraft engine seal apparatus comprising
an inflatable seal with a front wall,
a rear wall, and
a side wall forming a rim for pressing and sealing against an internal surface of an engine intake, and
an inflation port,
at least one access hatch which is openable to allow access into a cavity behind the seal in use, and
a flange extending in the plane of the front seal wall.

8. The aircraft engine seal apparatus as claimed in claim 7, wherein there are at least two access hatches.

9. The aircraft engine seal apparatus as claimed in claim 7, wherein the apparatus comprises a plurality of handles secured to the front wall, and wherein the or each at least one access hatch is located on a lower part of the front wall, adjacent a plurality of the handles and a pneumatic port.

10. The aircraft engine seal apparatus as claimed in claim 7, wherein the apparatus further comprises a holder mounted to the internal wall and being configured to support one or more desiccant bag, and wherein the holder comprises a mesh bag, and wherein the mesh bag has a lower wall or base of non-porous material to prevent desiccant from coming into contact with the internal surface of the engine intake.

11. The aircraft engine seal apparatus of claim 7, further comprising at least one flexible connector secured to the front wall and being configured to extend forwardly and around to an external connector of the engine intake, wherein the flexible connector comprises a lanyard terminating in a pin for engagement with said engine external connector.

12. The aircraft engine seal apparatus as claimed in claim 7, further comprising at least one flexible connector secured to the front wall and being configured to extend forwardly and around to an external connector of the engine intake, wherein the flexible connector comprises a lanyard terminating in a pin for engagement with said engine external connector; and wherein the flexible connector further comprises a pocket secured to the front wall and being adapted to house the lanyard when not in use.

13. The aircraft engine seal apparatus of claim 7 further comprising a flexible tab secured to the front wall adjacent the rim, said tab having a length which matches a desired axial separation of the apparatus front wall from a circumferential reference line around the engine intake.

14. The aircraft engine seal apparatus of claim 7, further comprising a fan mounted between the front and rear walls for forming a negative air pressure within an engine chamber in use, and a power source for the fan.

15. An aircraft engine seal apparatus comprising
an inflatable seal with a front wall,
a rear wall, and
a side wall forming a rim for pressing and sealing against an internal surface of an engine intake, and
an inflation port,
at least one access hatch which is openable to allow access into a cavity behind the seal in use, and
a humidity probe which is configured to fit within an access hatch, and wherein a door of an access hatch has a window for viewing of said humidity probe to provide a visual indication of humidity in the engine.

16. An aircraft engine seal apparatus comprising
an inflatable seal with a front wall,
a rear wall, and
a side wall forming a rim for pressing and sealing against an internal surface of an engine intake, and
an inflation port,
at least one access hatch which is openable to allow access into a cavity behind the seal in use, and
a holder mounted to the internal wall and being configured to support one or more desiccant bag, and wherein the holder comprises a mesh bag.

17. A method of sealing an aircraft engine when not in use, the method being performed with a seal apparatus comprising:
an inflatable seal with a front wall,
a rear wall, and
a side wall forming a rim for pressing and sealing against an internal surface of an engine intake, and
an inflation port,
wherein the apparatus further comprises at least one access hatch which is openable to allow access into a cavity behind the seal in use;
wherein the method comprises a step of inflating a seal of the seal apparatus until the rim engages and seals against the internal surface of the engine intake of the aircraft engine,
and comprising the further steps of inserting at least one desiccant bag through the access hatch, closing the hatch, and subsequently replacing said desiccant bag when it is spent by use of the hatch and without deflating the seal.

18. The method as claimed in claim 17, comprising the further step of inserting a hose of a drier through the access hatch and drying the engine compartment behind the seal by operation of the drier; and wherein said drier is used before insertion of a desiccant bag, and/or while a desiccant bag is in place behind the seal, and/or after removal of the desiccant bag.

* * * * *